Oct. 11, 1927.
R. J. LOOCK
1,645,247
SHIM FOR UNIVERSAL JOINTS
Filed Aug. 26, 1924
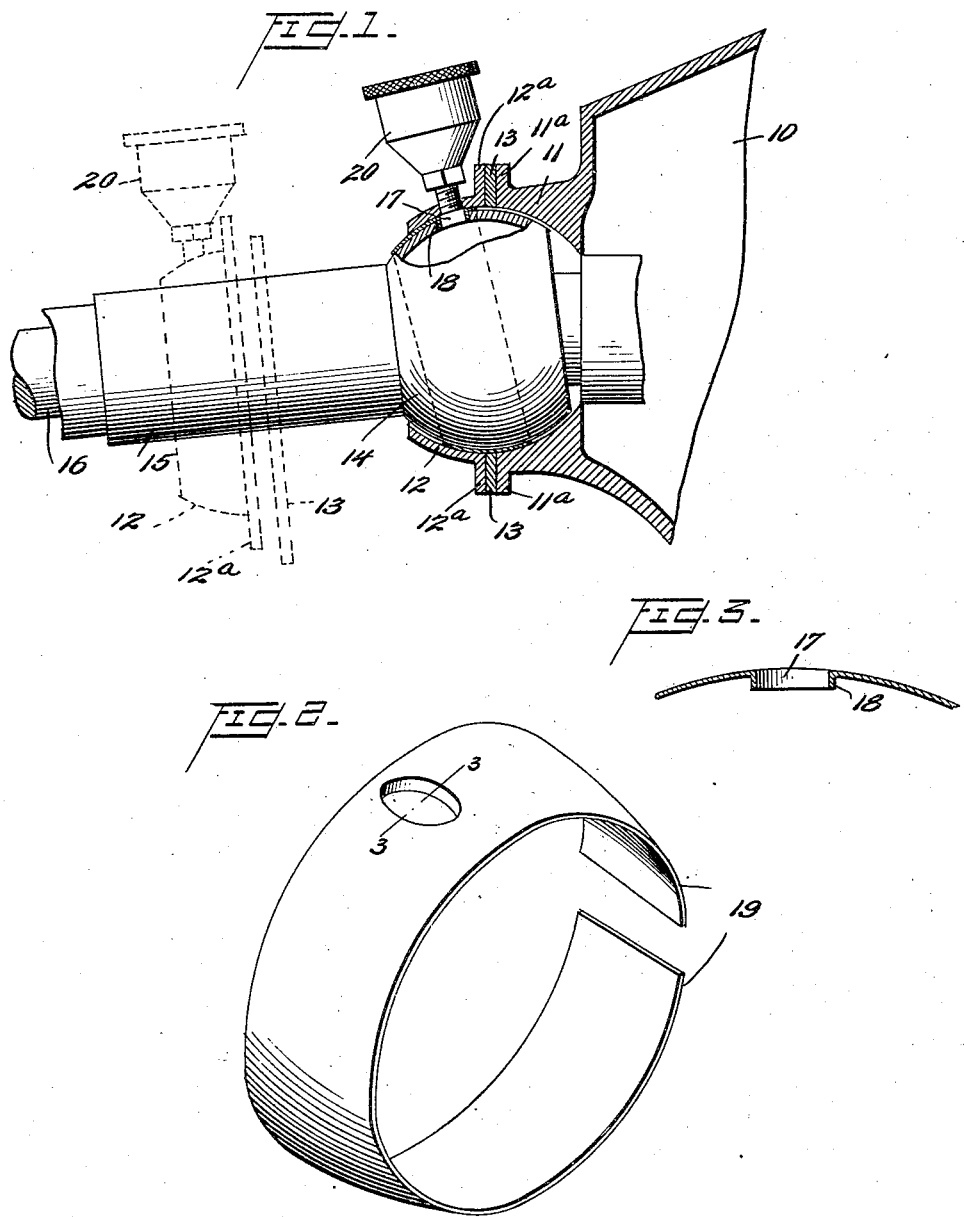
Inventor
Robert J. Loock,
By Wm. D. Shoemaker
Attorney Patented Oct. 11, 1927.

1,645,247

UNITED STATES PATENT OFFICE.

ROBERT J. LOOCK, OF BALTIMORE, MARYLAND.

SHIM FOR UNIVERSAL JOINTS.

Application filed August 26, 1924. Serial No. 734,287.

This invention relates to a bushing sleeve or shim for the ball casing and socket which encloses a universal joint. It has special application to the parts of an automobile transmission wherein the wear due to travel is quite considerable in a short period of time and unless the wear is taken up, damage is done to a number of parts of the automobile which are subjected to end thrusts resulting from the looseness between ball casing and socket.

The bushing sleeve or shim is made of thin sheet steel, being split on the side or crosswise, so that it can be slipped over the shaft or housing and up around the ball joint.

The invention has for its object the provision of a shim for the ball casing and socket enclosing a universal joint, which can be readily inserted at a minimum expenditure of time, obviating the necessity of pulling down the transmission and installing new transmission parts. A further object is the provision of a bushing sleeve or shim which will be held in proper position at all times, which will act as a closure for the joint between the flanges of the ball casing and socket to confine the lubricant, and which will effectually compensate for wear between the parts.

Other objects and advantages of the invention will hereinafter appear in the following description and the novel features thereof will be particularly pointed out in the appended claim.

Like reference characters indicate like parts throughout the several figures of the drawing, in which—

Figure 1 is a longitudinal section through that portion of an automobile transmission which includes the universal joint.

Figure 2 is a perspective of the bushing sleeve or shim, and

Figure 3 is a section through a portion of the same showing the inward burr or flange by means of which the shim is held in proper position upon the ball of the joint.

The numeral 10 indicates the rear portion of a gear case of an automobile transmission terminating in the socket section 11. The socket of a universal joint is formed by this section 11 and the collar section 12, these two parts being provided with outwardly projecting flanges 11ª and 12ª, by means of which they are firmly secured to each other through the medium of bolts. Between the two flanges is a packing ring 13 of cork or other suitable material.

Within the socket just described a ball shaped casing 14 is adapted to move in a universal manner. The ball casing is provided with a sleeve 15 mounted upon the torque shaft tube 16. In the travel of the vehicle it will be appreciated that the ball shaped casing 14 will move freely within the socket formed by the members 11 and 12, and that these parts will wear and the joint between them will become loose, resulting in a certain amount of rattle or noise, and if continued, resulting in damage to other parts of the transmission due to end thrusts permitted by the wear of this joint. To overcome these disadvantages, the bushing sleeve or shim of this invention has been devised. The shim is shown in perspective in Figure 2 of the drawing.

It is made of hard steel being stamped to conform in shape to a section of the outer surface of the ball casing. It is split in order to permit its easy insertion around the sleeve 15, and it is provided with an aperture 17 formed with a depending flange or burr 18, which takes into an aperture of similar size in the ball casing.

When it is desired to insert the bushing or shim within the joint, the bolts passing through the flanges 11ª and 12ª are removed and the collar 12 and cork washer 13 are moved backward into the dotted line positions shown in Figure 1. The shim, being split, can then be placed upon the sleeve 15 between the ball casing and the washer. It is then brought up to the ball casing and made to fit the same snugly with the flange 18 lying within the aperture in the ball casing. In this position the forward edge of the shim will move under the cork washer and into the socket portion 11 and will thus act to take up wear between the ball casing and both sections of the socket and will also act as a cover for the joint between the flanges 11ª and 12ª assisting in the confining of lubricant within the ball casing.

When the bushing or shim is in place as just described, the cork washer 13 and collar 12 will be brought up into normal position and the bolts reinserted through the flanges 11ª and 12ª. When the vehicle is at rest or stationary, the aperture 17 will be directly beneath the lower end of the grease cup 20 carried by the collar 12. The grease may be forced from the cup through the aperture 17 into the ball casing for the proper lubrication of the universal joint.

It would be appreciated that by my invention a bushing or shim is provided which will take up the wear upon the joint between the ball casing and its socket of an automobile, the shim will move with the ball casing, the wear on ball casing and both sections of the socket will be compensated for, the liability of loss of lubricant will be minimized and the grease apertures in the parts will be maintained in alignment without alteration of any of the parts of the vehicle. It will also be obvious that a great saving of time ordinarily consumed in replacement of parts to accomplish these functions will be effected.

Having described my invention what I claim as new and desire to secure by Letters Patent is A bushing or shim for taking up the wear between a ball casing and its socket of a universal joint, in which the casing and socket have aligned grease openings, consisting of a strip of metal having a shape conforming to a section of the outer surface of a ball casing and provided with an aperture surrounded by a depending flange to fit within the grease aperture of the ball casing and maintaining the shim stationary with respect to the ball casing during the relative movements of the casing and socket In testimony whereof I affix my signature.

ROBERT J. LOOCK